(12) United States Patent
Jeong et al.

(10) Patent No.: US 11,737,172 B2
(45) Date of Patent: Aug. 22, 2023

(54) METHOD AND DEVICE FOR MULTI-SUBSCRIBER IDENTITY MODULE (SIM) WIRELESS COMMUNICATION

(71) Applicant: SAMSUNG ELECTRONICS CO., LTD., Suwon-si (KR)

(72) Inventors: Wonseok Jeong, Suwon-si (KR); Kiho Kil, Seoul (KR); Anna Kim, Incheon (KR); Kwonyeol Park, Jeonju-si (KR); Ilmuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/937,472

(22) Filed: Oct. 3, 2022

(65) Prior Publication Data
US 2023/0067923 A1    Mar. 2, 2023

Related U.S. Application Data

(63) Continuation of application No. 17/336,614, filed on Jun. 2, 2021, now Pat. No. 11,464,078.

(30) Foreign Application Priority Data

Aug. 12, 2020  (KR) .......................... 10-2020-0101391

(51) Int. Cl.
*H04W 88/06*  (2009.01)
*H04L 5/00*  (2006.01)
(Continued)

(52) U.S. Cl.
CPC ........... *H04W 88/06* (2013.01); *H04L 5/0048* (2013.01); *H04L 63/0853* (2013.01);
(Continued)

(58) Field of Classification Search
CPC .......................... H04W 88/06; H04L 63/0853
See application file for complete search history.

(56) References Cited

U.S. PATENT DOCUMENTS

| | | |
|---|---|---|
| 8,170,616 B2 | 5/2012 | Lee |
| 8,406,741 B2 | 3/2013 | Kang et al. |
| | (Continued) | |

FOREIGN PATENT DOCUMENTS

| | | | | |
|---|---|---|---|---|
| CN | 110176940 | * | 4/2021 | ............... H04B 1/40 |
| DE | 102018204639 | | 10/2019 | |
| | (Continued) | | | |

OTHER PUBLICATIONS

3GPP TS 38.211 Physical channel and modulation (100 pages).
European Search Report dated Dec. 2, 2021 in corresponding European Patent Application No. 21180037.0 (10 pages).

*Primary Examiner* — Kevin Kim
(74) *Attorney, Agent, or Firm* — F. Chau & Associates, LLC

(57) ABSTRACT

The present disclosure provides a method for a multi-subscriber identity module (SIM) wireless communication. The method includes receiving a communication request, performing a first wireless communication, and performing a second wireless communication. Receiving a communication request by a second SIM while in wireless communication is based on a first SIM is performed via a plurality of antennas. Performing a first wireless communication is based on the first SIM communicating via a first antenna group that is a portion of the plurality of antennas, in response to a number of antennas used for wireless communication based on the first SIM and the second SIM that is greater than a number of available antennas of a terminal. Performing a second wireless communication is based on the second SIM via a second antenna group while the first (Continued)

wireless communication is performed and the second group is different from the first antenna group.

20 Claims, 14 Drawing Sheets

(51) Int. Cl.
*H04W 8/18* (2009.01)
*H04W 72/23* (2023.01)
*H04W 88/02* (2009.01)
*H04L 9/40* (2022.01)

(52) U.S. Cl.
CPC ......... *H04W 8/183* (2013.01); *H04W 72/23* (2023.01); *H04W 88/02* (2013.01)

(56) References Cited

U.S. PATENT DOCUMENTS

| | | | |
|---|---|---|---|
| 8,934,460 | B1 | 1/2015 | Hu et al. |
| 8,983,441 | B2 | 3/2015 | Baek |
| 9,025,576 | B2 | 5/2015 | Sikri et al. |
| 10,523,375 | B2 | 12/2019 | Dev et al. |
| 10,623,946 | B1* | 4/2020 | Kumar ................ H04W 76/16 |
| 2011/0261716 | A1 | 10/2011 | Kim et al. |
| 2013/0150111 | A1 | 6/2013 | Su et al. |
| 2015/0056933 | A1* | 2/2015 | Yan ........................ H04B 1/44 |
| | | | 455/78 |
| 2015/0257027 | A1 | 9/2015 | Bodduru et al. |
| 2017/0295513 | A1 | 10/2017 | Lee et al. |
| 2018/0184309 | A1 | 6/2018 | Bhardwaj et al. |
| 2020/0128391 | A1 | 4/2020 | Yun et al. |
| 2021/0112399 | A1* | 4/2021 | Gopal ................. H04L 5/0048 |
| 2021/0127256 | A1 | 4/2021 | Li et al. |
| 2022/0053606 | A1 | 2/2022 | Jeong et al. |

FOREIGN PATENT DOCUMENTS

| | | | |
|---|---|---|---|
| JP | 2021524205 | 9/2021 | |
| KR | 10-1124482 | 2/2012 | |
| KR | 10-1585467 | 1/2016 | |
| KR | 10-1863314 | 5/2018 | |
| WO | WO-2015196348 A1 * | 12/2015 | ........... H04L 1/0033 |
| WO | 2019222954 | 11/2019 | |

* cited by examiner

METHOD AND DEVICE FOR MULTI-SUBSCRIBER IDENTITY MODULE (SIM) WIRELESS COMMUNICATION

CROSS-REFERENCE TO RELATED APPLICATION

This application is a continuation application of U.S. patent application Ser. No. 17/336,614, filed Jun. 2, 2021 which is based on and claims priority and benefit to Korean Patent Application No. 10-2020-0101391, filed on Aug. 12, 2020, in the Korean Intellectual Property Office, the disclosures of which are incorporated by reference herein in their entirety.

BACKGROUND

The present disclosure relates to a method and a device for wireless communication, and more particularly, to a method and a device for performing wireless communication using a multi-subscriber identity module (SIM).

A multi-SIM wireless communication device is a device that communicates using multiple SIMs. In some cases, a multi-SIM device uses of external antennas. In various examples, a multi-SIM wireless device may be a mobile phone, a personal digital assistant, a tablet, or a laptop with the ability to communicate using simultaneous communication methods.

Multi-SIM wireless communication devices communicate using radio frequency (RF) resources. Accordingly, when a new wireless communication connection request for a second SIM is received while the device is communicating using a first SIM, the device may either terminate the existing wireless communication or reject the connection for the new wireless communication.

In either case, a user may be inconvenienced because, despite the existence of two SIMs, the device is unable to establish multiple connections for both SIMs in parallel. Therefore, there is a need in the art for a system to communicate with a plurality of SIMs in parallel.

SUMMARY

The inventive concept provides a method and a device for simultaneously performing wireless communication by mapping and allocating wireless communication paths and antennas to a plurality of multi-subscriber identity modules (SIMs).

According to an embodiment of the inventive concept, a method of multi-subscriber identity module (SIM) wireless communication includes: receiving a communication request by a second SIM while communicating with a first SIM using a plurality of antennas; determining that a sum of a number of antennas used for communicating with the first SIM and a number of antennas for the communication request by the second SIM is greater than a number of available antennas; performing a first wireless communication based on the first SIM using a first antenna group comprising a portion of the plurality of antennas; and performing a second wireless communication based on the second SIM using a second antenna group while the first wireless communication is performed, the second antenna group being different from the first antenna group.

In addition, a multi-subscriber identity module (SIM) wireless communication device includes: a first SIM; a second SIM; a multi-SIM processor configured to receive a communication request by the second SIM while performing wireless communication based on the first SIM via a plurality of antennas, and to generate a first wireless communication signal based on the first SIM and a second wireless communication signal based on the second SIM when a number of antennas predicted for wireless communication based on the first SIM and the second SIM is greater than a number of available antennas; and a communication circuit configured to transmit the first wireless communication signal via a first antenna group comprising a portion of the plurality of antennas and to transmit the second wireless communication signal via a second antenna group, the second group being differentiated from the first antenna group.

A method of scheduling multi-subscriber identity module (SIM) wireless communication, the method includes: receiving a communication request by a second SIM while communicating with a first SIM using a plurality of antennas; determining that a sum of a number of antennas for wireless communication based on the first SIM and a number of antennas for wireless communication based on the second SIM is greater than a number of available antennas; allocating a first antenna group comprising a portion of the plurality of antennas to a first wireless communication based on the first SIM in response to the determination; allocating a second antenna group to a second wireless communication based on the second SIM, the second antenna group being differentiated from the first antenna group; and scheduling wireless communication so that a frequency range in which the first wireless communication is performed overlaps a frequency range in which the second wireless communication is performed.

BRIEF DESCRIPTION OF THE DRAWINGS

Embodiments of the inventive concept will be more clearly understood from the following detailed description taken in conjunction with the accompanying drawings.

DETAILED DESCRIPTION

The present disclosure relates generally to a multi-subscriber identity module (SIM) wireless communication. More particularly, embodiments of the present disclosure relate to a method of allocating different antenna resources to different wireless communication connections of the same wireless communication device. For example, a mobile phone may include two SIM cards and may be in range of two different communication networks. Embodiments of the present disclosure provide simultaneous communication from a first set of antennas to a first SIM card and a second set of antennas to a second SIM card.

Conventional wireless communication devices are not often unable maintain multiple wireless communication connections simultaneously, leading to connection problems for multi-SIM devices. For example, when resources are used for two wireless connections, and the sum of the resources is greater than the available resources, the wireless communication may not be performed simultaneously.

The present disclosure provides a method for a multi-SIM wireless communication. The method includes receiving a communication request at a multi-SIM device, performing a first wireless communication, and then performing a second wireless communication. The multi-SIM device may receive a communication request associated with a second SIM while communicating using a first SIM via a plurality of antennas. In some examples, performing a first wireless communication is based on the first SIM communicating via a first antenna group that comprises a portion of the plurality of antennas. Performing a second wireless communication is based on the second SIM via a second antenna group. The second antenna group is different from the first antenna group. When a number of antennas used for wireless communication based on the first SIM and the second SIM that is greater than a number of available antennas of a terminal.

Hereinafter, embodiments of the inventive concept will be described in detail with reference to the accompanying drawings.

Figure 1:
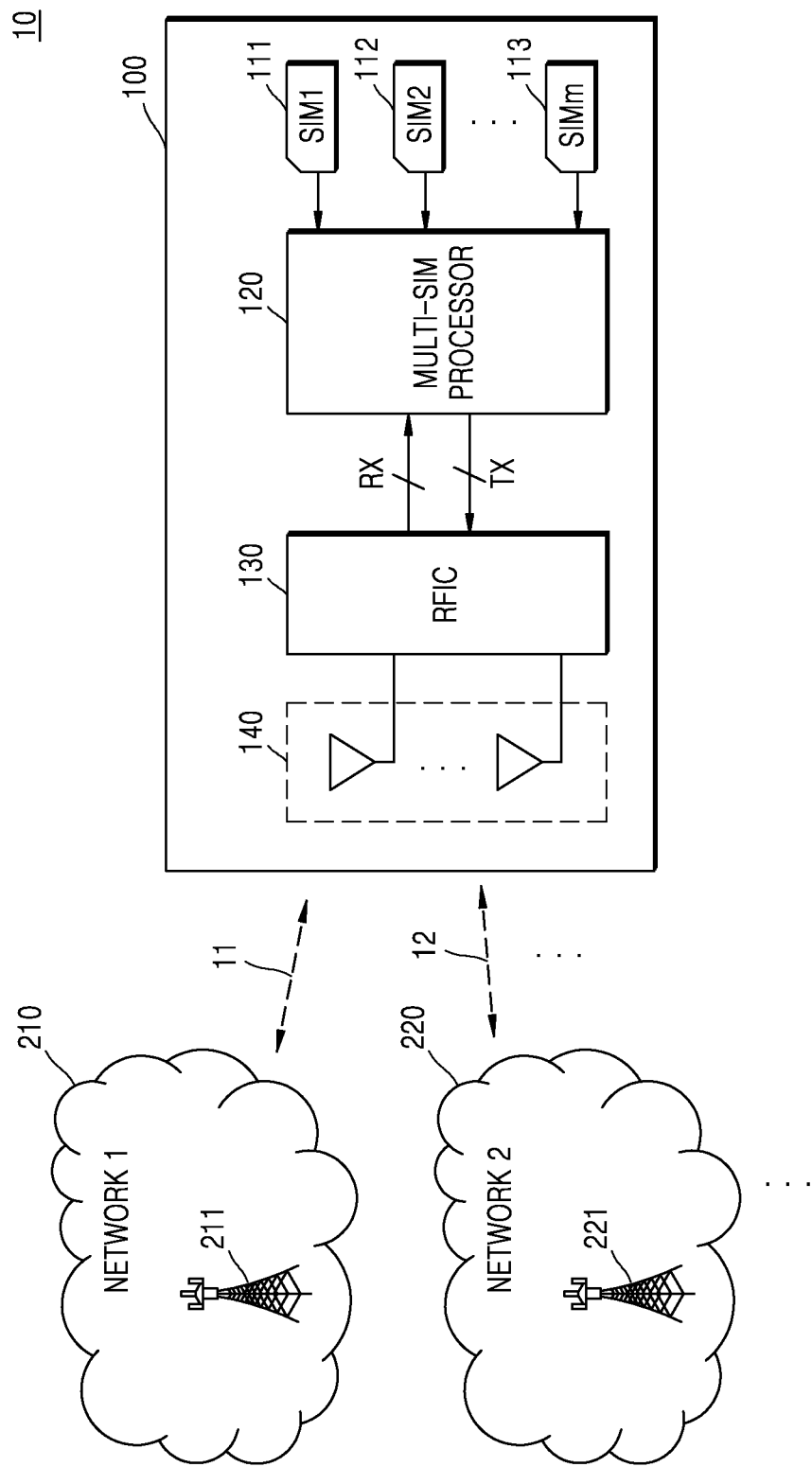
FIG. 1 is a block diagram of a wireless communication system according to an example embodiment of the inventive concept.

FIG. 1 is a block diagram of a wireless communication system 10 according to an example embodiment of the inventive concept.

Referring to FIG. 1, the wireless communication system 10 may include a wireless communication device 100 and a first network 210 and a second network 220. The wireless communication device 100 may be fixed or mobile, and may be referred to as an arbitrary device capable of transmitting and receiving data and/or control information by wirelessly communicating with the first and second networks 210 and 220. For example, the wireless communication device 100 may be referred to as a terminal, terminal equipment, a terminal device, a mobile station (MS), a mobile terminal (MT), a user terminal (UT), a subscriber station (SS), a wireless device, a handheld device, etc.

The first and second networks 210 and 220 may include a first base station 211 and a second base station 221, respectively. The first base station 211 or the second base station 221 may be referred to as a fixed station communicating with the wireless communication device 100 and/or other base stations, and by communicating with the wireless communication device 100 and/or other base stations, may exchange data and control information. For example, the first base station 211 or the second base station 221 may be referred to as a Node B, an evolved Node B (eNB), a next generation Node B (gNB), a sector, a site, a base transceiver system (BTS), an access point (AP), a relay node, a remote radio head (RRH), a radio unit (RU), a small cell, or the like. In the present specification, a station may be interpreted, in a generic sense, to denote some area or function covered by a base station controller (BSC) in code-division multiple access (CDMA), a Node-B in WCDMA, an eNode B (eNB) in LTE, a gNB in 5G new radio (NR), or a sector (site), or the like. The a station may cover all various coverage areas such as mega-cells, macro-cells, micro-cells, pico-cells, femto-cells, a relay node, an RRH, an RU, and a small cell communication range.

The wireless communication device 100 may access the first network 210 via the first base station 211, and may access the second network 220 via the second base station 221. The wireless communication device 100 may communicate with the first network 210 and the second network 220 according to an arbitrary radio access technology (RAT). For example, the wireless communication device 100 may communicate with the first network 210 and the second network 220 according to, as a non-limiting example, a 5th generator (5G) system, a 5G NR system, a long term evolution (LTE) system, a CDMA system, a global system for mobile communications (GSM) system, a wireless local area network (WLAN) system, or any other RAT. In some embodiments, the wireless communication device 100 may communicate with the first network 210 and the second network 220 according to the same RAT, and in some embodiments, the wireless communication device 100 may communicate with the first network 210 and the second network 220 according to different RATs from each other.

As illustrated in FIG. 1, the wireless communication device 100 may include an antenna array 140, a radio frequency integrated circuit (RFIC) 130, a multi-SIM processor 120, and m SIMs (for example, 111, 112, and 113) (where m is an integer greater than 1). The antenna array 140 may include at least one antenna and receive RF signals from the first base station 211 and the second base station 221, or transmit the RF signals to the first base station 211 and the second base station 221. In embodiments of the inventive concept, the antenna array 140 may include a plurality of antennas for multiple-input and multiple-output (MIMO).

The RFIC 130 may include hardware coupled with the antenna array 140 and the multi-SIM processor 120, and may provide RF resources (for example, RF paths) for wireless communication. For example, the RFIC 130 may be referred to as a transceiver, provide a received signal RX as a baseband signal to the multi-SIM processor 120 by processing the RF signal received from the antenna array 140, and provide the RF signal to the antenna array 140 by processing a transmission signal TX as a baseband signal. The RFIC 130 may be controlled by the multi-SIM processor 120, and may include, as non-limiting examples, a switch, a matching circuit, a filter, an amplifier, a mixer, or the like.

The multi-SIM processor 120 may communicate with the RFIC 130 by using baseband signals RX and TX, and may be coupled with m SIMs (for example, 111, 112, 113, or the like). For example, in an embodiment of FIG. 1, a first SIM 111 may include information for accessing the first network 210 via a first wireless communication 11, and a second SIM 112 may include information for accessing the second network 220 via a second wireless communication 12. As described later with reference to FIG. 2, the multi-SIM processor 120 may have an architecture for handling a connection related to the first SIM 111 and a connection related to the second SIM 112 In some embodiments, the multi-SIM processor 120 may include a hardware block designed by using logical synthesis, a processing unit including at least one processor performing a software block and a series of commands, and a combination thereof. In some embodiments, the multi-SIM processor 120 may be referred to as a modem or a baseband processor.

The m SIMs (for example, 111, 112, 113, or the like) may support multi-SIM (MS) wireless communication. For example, referring to FIG. 1, the first SIM 111 may perform the first wireless communication 11 related to the first network 210 including the first base station 211, and the second SIM 112 may perform the second wireless communication 12 related to the second network 220 including the second base station 221. The first wireless communication 11 and the second wireless communication 12 may be referred to as a first connection and a second connection, or as a first subscription and a second subscription, respectively. The wireless communication device 100, according to an embodiment of the inventive concept, may perform the first wireless communication 11 by using a first antenna group of the antenna array 140. Additionally, or alternatively, the wireless communication device 100 may perform the second wireless communication 12 by using a second antenna group that does not overlap the first antenna group.

As in the example described above, when two wireless communications based on two SIMs (for example, 111 and 112) are performed, the wireless communication device 100 may be referred to as a dual-SIM device and may operate as a dual receive (DR) single transmit dual-SIM dual-standby (DSDS) (DR-DSDS) device or a dual-SIM dual-active (DSDA) device.

The multi-SIM processor 120 of the wireless communication device 100 may receive data streams from a plurality of SIMs, and determine an antenna for transmitting data corresponding to each data stream of the antenna array 140. Accordingly, the multi-SIM processor 120 may allocate antennas used by the SIM for communication and may efficiently use limited antenna resources by dynamically determining the number of antennas to be allocated according to communication performance used by the SIM. For example, when the first SIM 111 transmits two data streams to the multi-SIM processor 120 to perform the first wireless communication 11, the multi-SIM processor 120 may allocate two antennas of the antenna array 140 to transmit data corresponding to the two data streams. Additionally, or alternatively, when the first SIM 111 determines that a communication quality less than that of previous communication quality is satisfied, the multi-SIM processor 120 may allocate one antenna to the first wireless communication 11 by receiving one data stream, and the wireless communication device 100 may use extra antennas for wireless communication of other SIMs except for the first SIM 111 of the plurality of SIMs.

Figure 2:
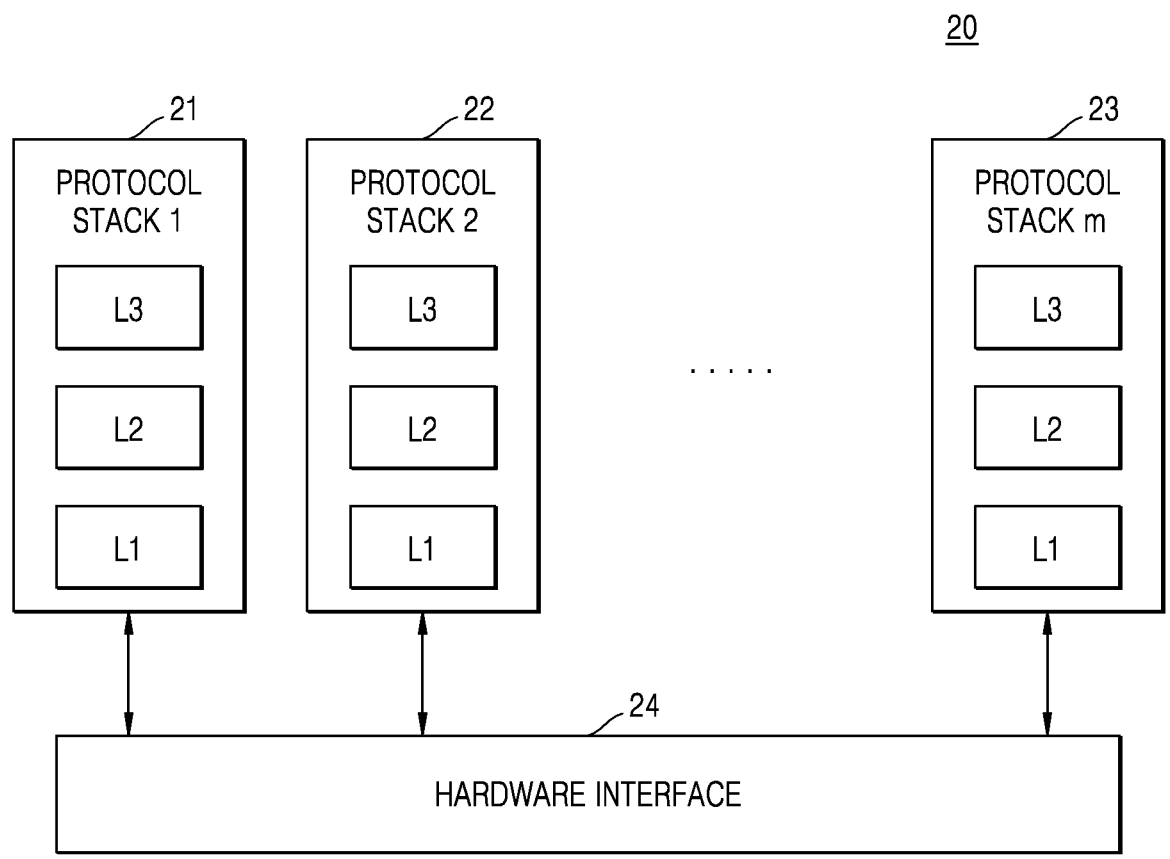
FIG. 2 is a block diagram of a protocol stack system according to an embodiment of the inventive concept.

FIG. 2 is a block diagram of a protocol stack system 20 according to an embodiment of the inventive concept.

FIG. 2 illustrates a control plane of a protocol stack system 20 with a first protocol stack 21 and a second protocol stack 22. In some embodiments, the protocol stack system 20 of FIG. 2 may be implemented by the multi-SIM processor 120 in FIG. 1, and the multi-SIM processor 120 may perform operations for wireless communication by using the protocol stack system 20 of FIG. 2. At least some of the blocks illustrated in FIG. 2 may be implemented as hardware logics in some embodiments or as software modules to be executed by at least one processor in some embodiments.

Referring to FIG. 2, the protocol stack system 20 may include a first protocol stack (protocol stack1) 21 and a second protocol stack (protocol stack2) 22 based on the first SIM 111 and the second SIM 112, respectively. As described above with reference to FIG. 1, each of the first protocol stack 21 and the second protocol stack 22 may support any RAT. In some embodiments, the protocol stack 1 21 and the second protocol stack 22 may interact with a shared upper layer. For example, the shared upper layer may be an application layer, and the upper layer may provide an interface for programs that obtain information about the first wireless communication 11 and the second wireless communication 12 or provide commands. The upper layer may be implemented in the multi-SIM processor 120 or in another device separate from the multi-SIM processor 120. In addition, the protocol stack system 20 may include a hardware interface 24 shared by the first protocol stack 21 and the second protocol stack 22. The hardware interface 24 may provide hardware, for example, an interface to the RFIC 130 in FIG. 1, and the first protocol stack 21 and the second protocol stack 22 may provide signals to the RFIC 130 or obtain signals from the RFIC 130 via the hardware interface 24. In some embodiments, the hardware interface 24 may be referred to as a driver of the RFIC 130.

Each of the first protocol stack 21, the second protocol stack 22, . . . , $m^{th}$ protocol stack (protocol stackm) 23 for the control plane may include a plurality of layers. As illustrated in FIG. 2, the first protocol stack 21 may include a first layer L1, a second layer L2, and a third layer L3, and the first layer L1, the second layer L2, and the third layer L3 may correspond to three lower layers of an open system interconnection (OSI) model. For example, in LTE or 5G NR, a physical (PHY) layer may be included in the first layer L1, a medium access control (MAC) layer, a radio link control (RLC) layer, and a packet data convergence protocol (PDCP) layer may be included in the second layer L2, and a radio resource control (RRC) layer and a non-access stratum (NAS) layer may be included in the third layer L3. The second protocol stack 22 may also include, similar to the first protocol stack 21, the first layer L1, the second layer L2, and the third layer L3. In the present specification, that the first protocol stack 21 performs an operation may be referred to as that the first SIM 111 performs an operation, and that the second protocol stack 22 performs an operation may be referred to as that the second SIM 112 performs an operation.

Figure 3A:
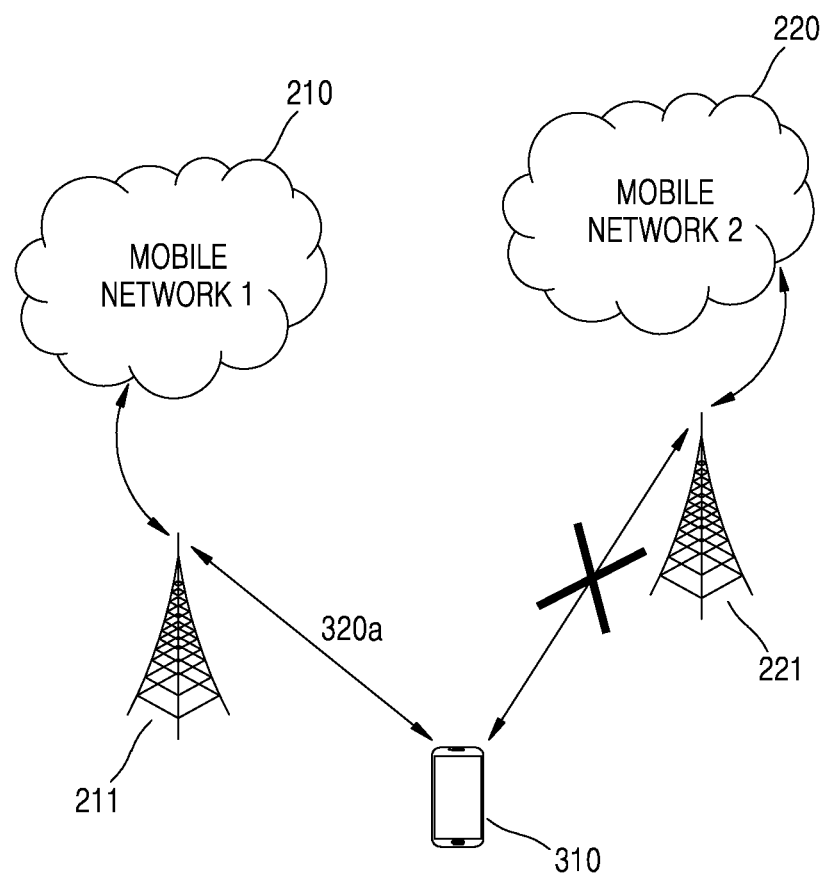
FIGS. 3A and 3B are drawings of comparison embodiments of a multi-subscriber identity module (SIM) communication method.
Figure 3B:
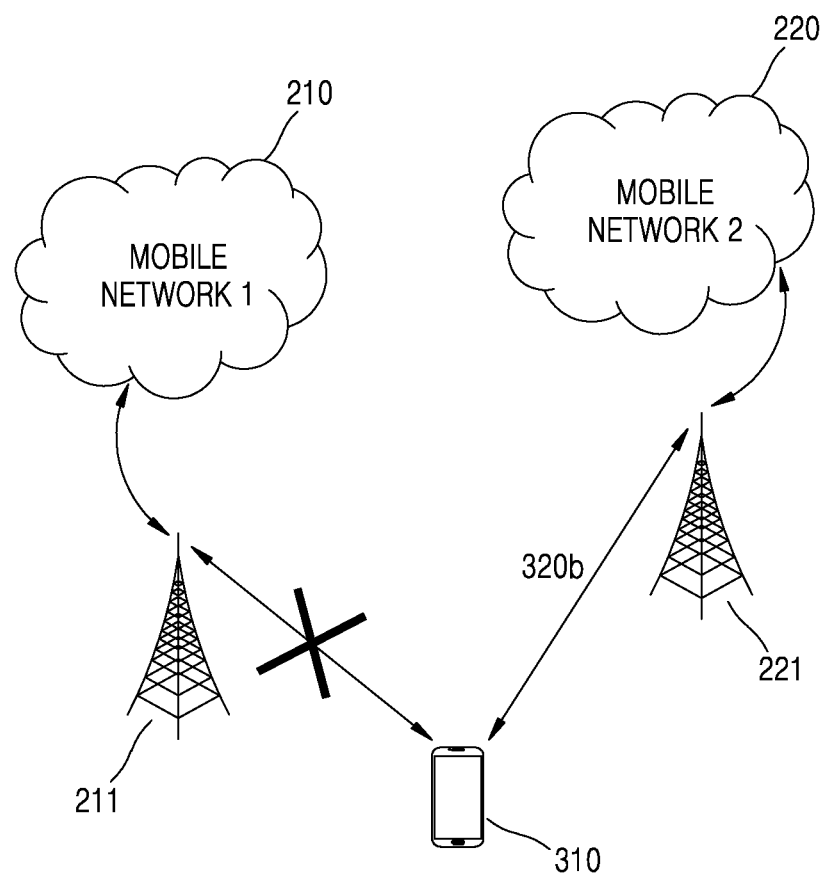

FIGS. 3A and 3B are drawings of comparison embodiments of a multi-SIM communication method.

The multi-SIM processor 120, according to an embodiment, may determine whether simultaneous transmission of a first wireless communication 320a and a second wireless communication 320b is possible based on RF resources such as an antenna. When it is determined that the multi-SIM processor 120 is capable of simultaneous transmission, some of the RF resources of the RFIC 130 may be allocated to each of the first wireless communication 320a and the second wireless communication 320b. As an example, when the number of antennas used for the first wireless communication 320a and the second wireless communication 320b is less than the number of available antennas, some of the available antennas may be allocated to each of the first wireless communication 320a and the second wireless communication 320b.

However, when the multi-SIM processor 120 receives a request for the second wireless communication 320b from the second SIM 112 while the first SIM 111 performs wireless communication via some of the plurality of transmission antennas, the number of antennas greater than the number of available antennas may be used for the second wireless communication 320b. Accordingly, referring to FIG. 3A, even when a request for the second wireless communication 320b is received from the second SIM 112, a terminal device 310 may establish communication with a first mobile network (mobile network1) by transmitting a signal of the first wireless communication 320a to the first base station 211, but may not establish communication with a second mobile network (mobile network2) 220 because a signal of the second wireless communication 320b is not transmitted to the second base station 221.

Referring to FIG. 3B, after a request for a second wireless communication 320b from the second SIM 112 is received and a certain period of time elapses, by blocking the first wireless communication 320a, and allocating at least some of the antennas that have been allocated to the first wireless communication 320a to the second wireless communication 320b, the terminal device 310 may transmit the signal of the second wireless communication 320b to the second base station 221. In other words, when the number of antennas used for the first wireless communication 320a and the second wireless communication 320b is greater than the number of available antennas, the terminal device 310 may exclusively perform the first wireless communication 320a and the second wireless communication 320b.

Figure 4A:
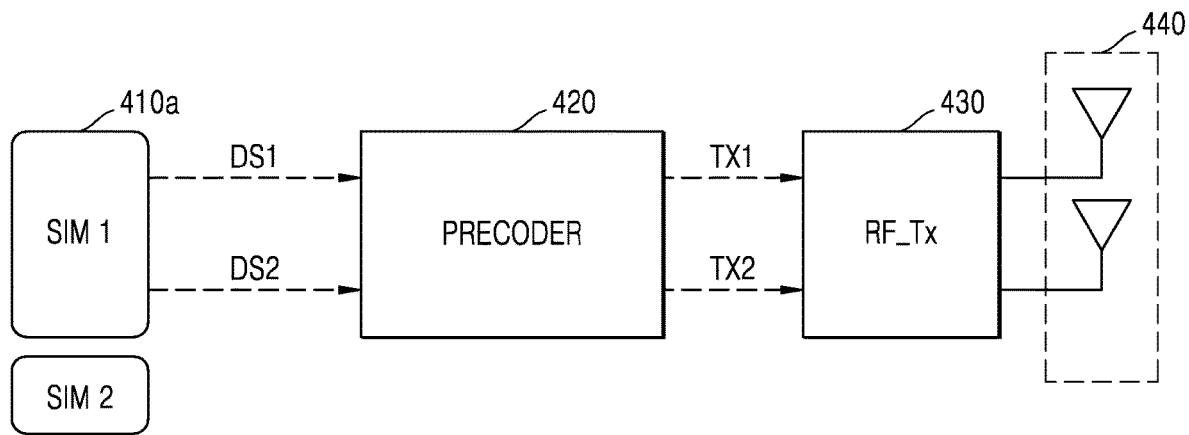
FIGS. 4A and 4B are block diagrams of embodiments of a first SIM and a second SIM, respectively.
Figure 4B:
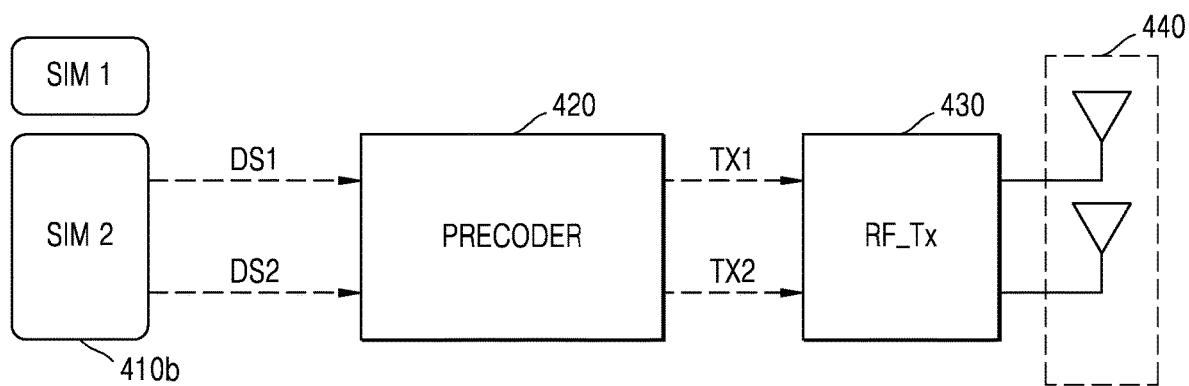
Figure 4C:
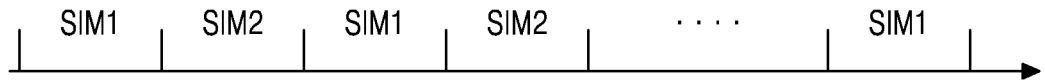
FIG. 4C is a timing diagram of a wireless communication method by using a first SIM and a second SIM, according to an embodiment of the inventive concept.

FIGS. 4A and 4B are block diagrams of embodiments of a first SIM 410a and a second SIM 410b, respectively, and FIG. 4C is a timing diagram of a wireless communication method by using the first SIM 410a and the second SIM 410b, according to an embodiment of the inventive concept.

The first SIM 410a of a wireless communication device may divide a data packet into a plurality of data streams to perform a first wireless communication, and the wireless communication device may generate wireless communication signals corresponding to the number of data streams and allocate antennas for the first wireless communication. Referring to FIG. 4A, for the wireless communication, the first SIM 410a may divide a data packet into two data streams DS1 and DS2, and transmitted the two data streams DS1 and DS2 to the precoder processor 420. After receiving the two data streams DS1 and DS2, the precoder processor 420 may generate two wireless communication signals, respectively.

The precoder processor 420, according to an embodiment, may convert the received two data streams DS1 and DS2 into the wireless communication signals TX1 and TX2 based on a precoding matrix, respectively. As an example, the precoder processor 420 may generate the wireless communication signals TX1 and TX2 with orthogonality to each other based on the precoding matrix. Therefore, interference may not occur when a plurality of wireless communication signals are transmitted via antennas of a communication device. The precoding matrix for satisfying the orthogonality of communication signals may include one of the matrices in Table 1 below.

TABLE 1

| TPMI[0] | TPMI[1] | TPMI[2] |
|---|---|---|
| $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

When the wireless communication device, according to an embodiment, requests communication to a base station via a plurality of wireless communication signals, the base station may transmit a transmit precoding matrix index (TPMI) to the wireless communication device. The TPMI may be an index value allocated to the wireless communication device based on a signal reception state of the base station, and according to Table 1, the base station may assign one of the three index values TPMI[0] through TPMI[2] to the wireless communication device. The precoder processor 420 of the wireless communication device receiving the TPMI value may convert the data streams DS1 and DS2 into the wireless communication signals TX1 and TX2 in a matrix corresponding to the TPMI value, respectively.

The RFIC 430 of the wireless communication device may transmit a wireless communication signal to a network via an RF path. Referring to FIG. 4A, the RFIC 430 may receive the two wireless communication signals TX1 and TX2 of the precoder processor 420, and transmit the wireless communication signals TX1 and TX2 to the network via two available antennas of the antenna array 440, respectively.

When the precoder processor 420 receives a communication request from the second SIM 410b, the precoder processor 420 may determine whether there is an allocable antenna of antennas except the antenna allocated for the first wireless communication due to the first SIM 410a. Additionally, or alternatively, when the precoder processor 420 determines that the number of allocable antennas is less than the number of antennas used for a second wireless communication by the second SIM 410b, the second wireless communication may be performed after the first wireless communication is maintained for a certain period of time.

Referring to FIG. 4B, the precoder processor 420 may generate two wireless communication signals TX1 and TX2, by blocking reception of the data streams from the first SIM 410a and receiving two data streams DS1 and DS2 from the second SIM 410b. In other words, when it is determined that the number of antennas used for performing the first wireless communication and the second wireless communication is greater than the number of available antennas, the wireless communication device may block the first wireless communication and perform the second wireless communication.

Accordingly, referring to FIG. 4C, the multi-SIM processor 120 may perform alternately the first wireless communication and the second wireless communication by using RF switching, and may not simultaneously perform the first wireless communication and the second wireless communication. When the first wireless communication is blocked for a long time for performing the second wireless communication, a connection of the wireless communication device to the base station for performing the first wireless communication may be lost, and during a time period for resuming the lost connection, communication may be inefficiently performed due to data loss.

Figure 5A:
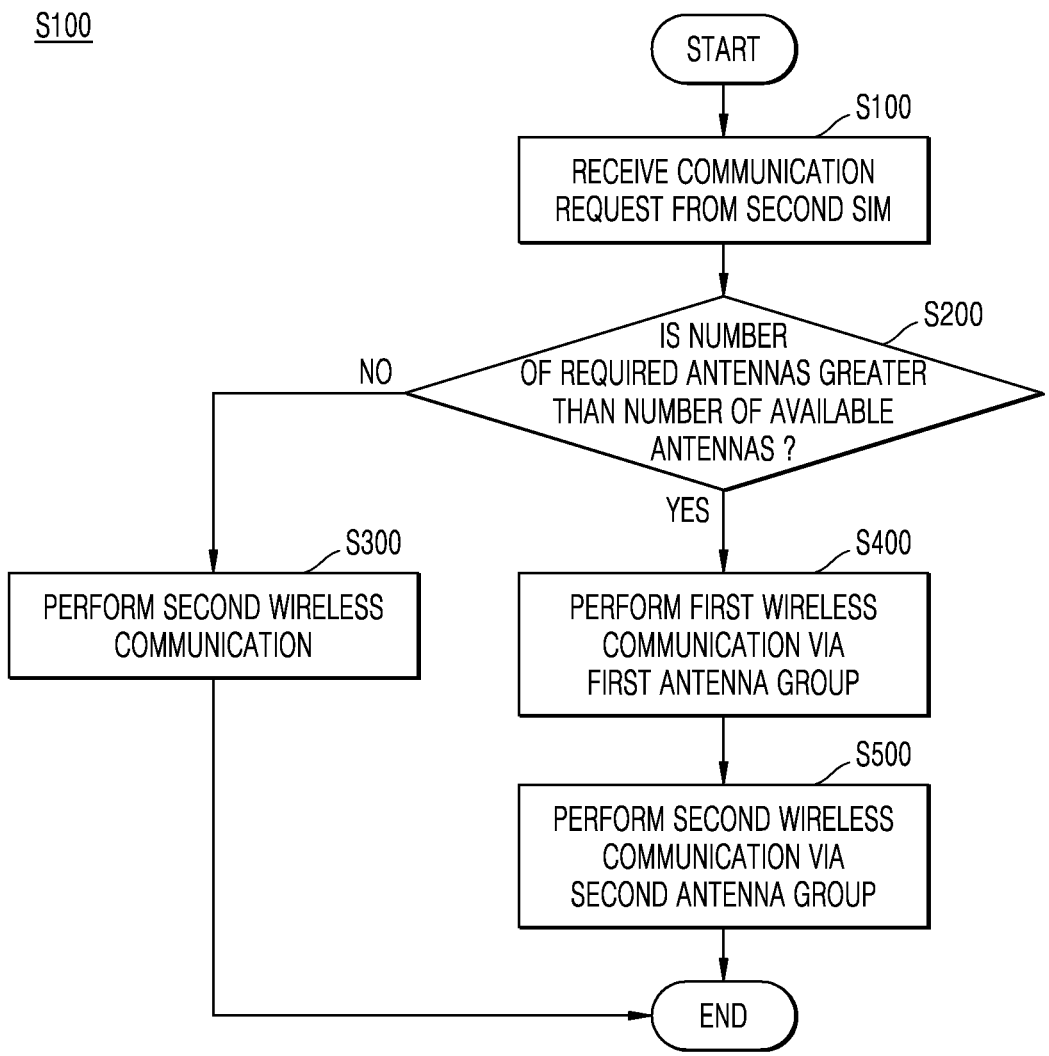
FIG. 5A is a flowchart of a communication method according to an embodiment of the inventive concept.
Figure 5B:
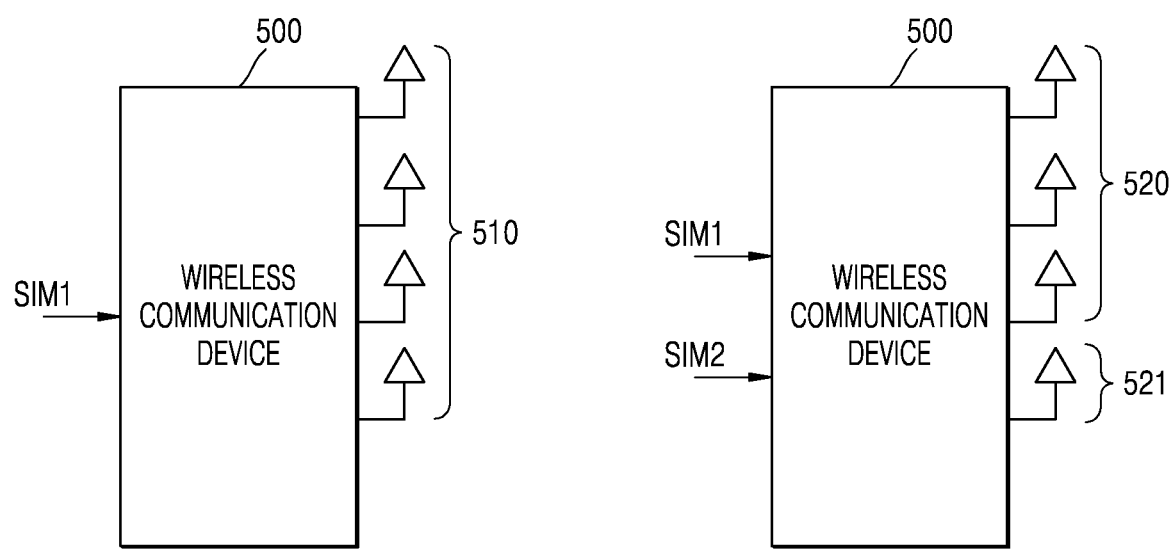
FIG. 5B is an example illustrating that some of antennas allocated to performing previous first wireless communication are allocated to a first wireless communication, and the rest are allocated to a second wireless communication, according to an embodiment of the inventive concept.

FIG. 5A is a flowchart of a communication method according to an embodiment of the inventive concept, and FIG. 5B is an example illustrating that some of antennas allocated to performing the previous first wireless communication are allocated to the first wireless communication, and the remaining antennas thereof are allocated to the second wireless communication, according to an embodiment of the inventive concept.

Referring to FIGS. 5A and 5B, when the number of antennas used for the first wireless communication and the second wireless communication is greater than the number of available antennas, by allocating the first antenna group of the available antennas to the first wireless communication and the second antenna group of the available antennas to the second wireless communication, both the first wireless communication and the second wireless communication may be performed simultaneously.

A multi-SIM processor, according to an embodiment of the inventive concept, may receive a communication request from a second SIM while performing a first wireless communication based on a first SIM (S100). The multi-SIM processor may compare the number of antennas used for the first wireless communication and the second wireless communication with the number of available antennas (S200). The multi-SIM processor may determine, as the number of available antennas, the number of antennas obtained by subtracting the number of antennas allocated to wireless communication for the first wireless communication and the second wireless communication from the total number of antennas. The multi-SIM processor may determine the number of antennas by using the number of data streams received from the first SIM and the second SIM. Comparison of the number of used antennas with the number of available antennas is not limited thereto, and may include receiving the data streams from the second SIM by the multi-SIM processor, and determining by the multi-SIM processor whether an error occurs due to a lack of the number of antennas for transmitting the wireless communication signal.

When the multi-SIM processor determines that the number of used antennas is less than the available antennas, the multi-SIM processor may perform the first wireless communication and the second wireless communication simultaneously by allocating antennas other than the antennas allocated for the previous first wireless communication of the available antennas to the second wireless communication (S300).

Accordingly, in some examples the multi-SIM device receives a communication request by a second SIM while communicating with a first SIM using a plurality of antennas. Then the multi-SIM processor determines that a sum of a number of antennas for wireless communication based on the first SIM and a number of antennas for wireless communication based on the second SIM is greater than a number of available antennas (e.g., the total number of antennas of the multi-SIM device), allocates a first antenna group comprising a portion of the plurality of antennas to a first wireless communication based on the first SIM in response to the determination, and allocates a second antenna group to a second wireless communication based on the second SIM, the second antenna group being differentiated from the first antenna group.

Then the multi-SIM device schedules wireless communications for the first SIM and the second SIM using the first antenna group and the second antenna group, respectively, In some cases, the wireless communication is performed so that a frequency range in which the first wireless communication is performed overlaps a frequency range in which the second wireless communication is performed.

Referring to FIG. 5B, when the multi-SIM processor determines that the number of used antennas is greater than the number of available antennas, the first wireless communication may be performed via a first antenna group 520, which may be a portion of the plurality of antennas 510 previously allocated to the first wireless communication (S400). In other words, a wireless communication device 500 may perform the first wireless communication with the first antenna group 520, which may be a portion of the antennas 510 previously allocated to the first wireless communication, and by not allocating a remaining antenna group or a second antenna group 521 to the first wireless communication, may retain the remaining antenna group (i.e., second antenna group 521) as antennas available for performing the second wireless communication.

The multi-SIM processor may perform the second wireless communication via the second antenna group 521, differentiated from the first antenna group 520 (S500). In other words, the wireless communication device 500 may perform the second wireless communication by allocating to the second wireless communication the available antennas reserved for performing the second wireless communication of the antennas 510 previously allocated to the first wireless communication.

Figure 6:
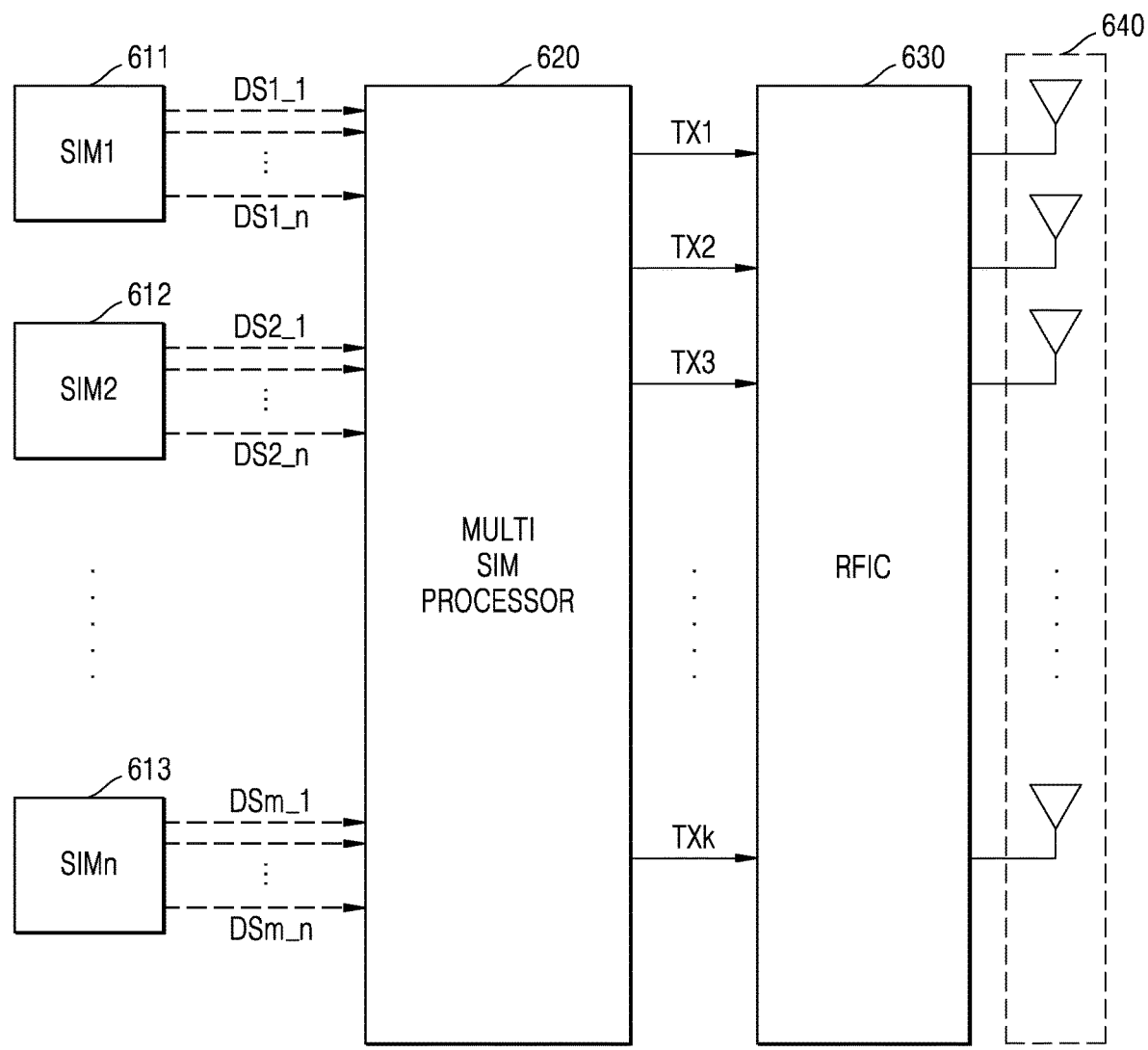
FIG. 6 is a block diagram illustrating signal transmission and reception of a wireless communication device, according to an embodiment of the inventive concept.

FIG. 6 is a block diagram illustrating signal transmission and reception of a wireless communication device, according to an embodiment of the inventive concept.

Referring to FIG. 6, a multi-SIM processor 620 may receive first through $n^{th}$ data streams DS1_1 through DSm_n from a plurality of SIMs (for example, a first SIM 611, a second SIM 612, and an nth SIM 613), and by transmitting to an RFIC 630 first through $k^{th}$ wireless communication signals TX1 through TXk based on the received first through $n^{th}$ data streams DS1_1 through DSm_n, the multi-SIM processor 620 may transmit to a network the first through $k^{th}$ wireless communication signals TX1 through TXk via an antenna array 640. The wireless communication device may transmit the first through $k^{th}$ wireless communication signals TX1 through TXk to one base station via a plurality of antennas, but the embodiment is not limited thereto, and according to some embodiments, based on an antenna allocated to each of the SIMs (for example, 611, 612, or 613), the wireless communication device may transmit the first through $k^{th}$ wireless communication signals TX1 through TXk to a plurality of base stations. For example, when performing the first wireless communication based on the first SIM 611, the multi-SIM processor 620 may allocate the first antenna group to the first wireless communication, and the first antenna group may transmit the first wireless communication signal to a first base station.

The SIMs (for example, 611, 612, or 613) may divide the data packet into a plurality of data streams according to the capacity of the data to be transmitted. As a larger amount of data is to be transmitted, the SIMs (for example, 611, 612, or 613) may divide the data packet into more data streams. For example, the SIMs (for example, 611, 612, or 613) may transmit one to four data streams to the multi-SIM processor 620 according to a size of the data packet. When a large amount of data is to be transmitted, the SIMs (for example, 611, 612, or 613) may divide the data packet into four data streams and transmit the four data streams to the multi-SIM processor 620. However, the number of data streams is not limited to being determined according to the capacity of data, and may be determined based on uplink layer information received from a base station.

The multi-SIM processor 620 according to an embodiment may generate wireless communication signals corresponding to the number of data streams, and may allocate as many antennas as the number of data streams for wireless communication. As an example, the multi-SIM processor 620, which has received four data streams from the first SIM 611, may generate four wireless communication signals, and allocate four antennas for performing the first wireless communication. However, as to be described later with reference to FIG. 13, when it is determined that data streams may be merged, the multi-SIM processor 620 may generate wireless communication signals corresponding to the number of merged data streams, and allocate an antenna.

Figure 7:
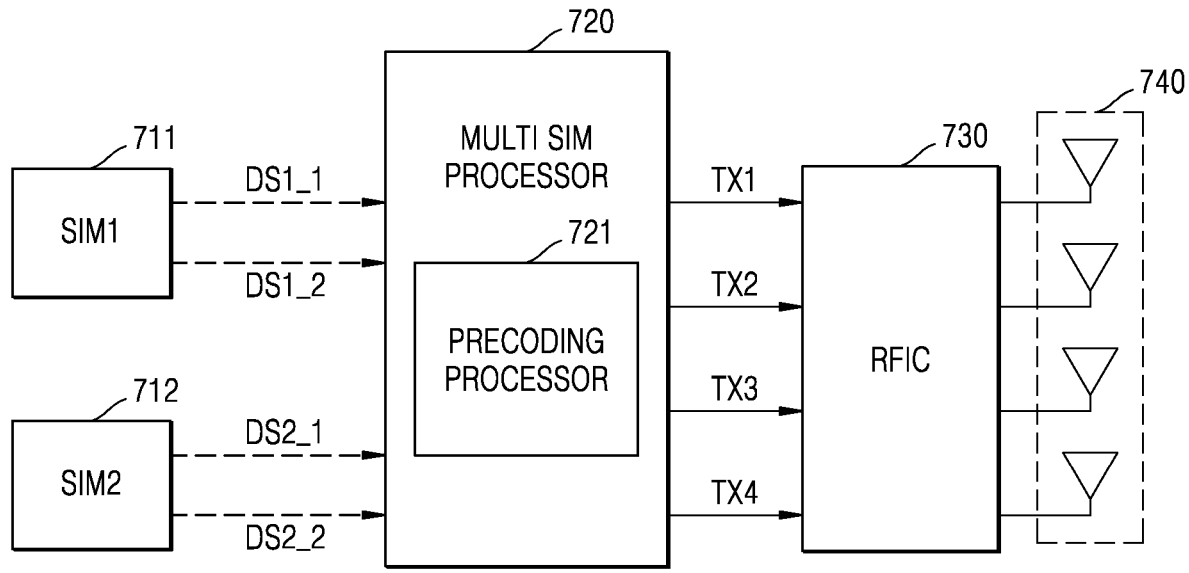
FIG. 7 is a block diagram illustrating signal transmission and reception of a wireless communication device, when the number of available antennas is greater than the number of antennas used for communication using a first SIM and a second SIM, according to an embodiment of the inventive concept.

FIG. 7 is a block diagram illustrating signal transmission and reception of a wireless communication device, when the number of available antennas is greater than the number of antennas used for communication using a first SIM and a second SIM, according to an embodiment of the inventive concept.

Referring to FIG. 7, a wireless communication device according to an embodiment of the inventive concept may receive a request for the second wireless communication from a second SIM 712 while performing the first wireless communication based on a first SIM 711, and a multi-SIM processor 720 may determine whether it is possible to perform the second wireless communication simultaneously with the first wireless communication based on the number of data streams received from the second SIM 712. The multi-SIM processor 720 may determine the number of used antennas based on the number of received data streams, and compare the number of available antennas not allocated to the first wireless communication of the antenna array 740 with the number of used antennas. Additionally, or alternatively, when the number of available antennas is greater than or equal to the number of used antennas, by generating the wireless communication signals corresponding to the number of data streams received from the second SIM 712, and transmitting the wireless communication signal via the available antennas, the multi-SIM processor 720 may simultaneously perform the first wireless communication and the second wireless communication.

Referring to the example embodiment of FIG. 7, the multi-SIM processor 720 may generate two of first wireless communication signals TX1 and TX2 by receiving two first data streams DS1_1 and DS1_2 from the first SIM 711, and the first wireless communication signals TX1 and TX2 may perform the first wireless communication via the first antenna group of an antenna array 740. Additionally, or alternatively, when the second wireless communication with reception of two second data streams DS2_1 and DS2_2 from the second SIM 712 is received, the multi-SIM processor 720 may determine whether any of the available antennas is allocable for performing the second wireless communication. Because two of a total of four antennas 740 of the wireless communication device are assigned to the first wireless communication, the multi-SIM processor 720 may determine that two antennas are available antennas. After second wireless communication signals TX3 and TX4 corresponding to the second data streams DS2_1 and DS2_2 are generated, because the number of antennas used for transmitting the second wireless communication signals TX3 and TX4 is two, the multi-SIM processor 720 may simultaneously perform the first wireless communication and the second wireless communication by allocating the available antennas of the antenna array 740 to the second wireless communication.

A precoding processor 721 of the multi-SIM processor 720 according to an embodiment of the inventive concept may determine a precoding matrix based on the TPMI assigned by a base station, and convert each of the plurality of data streams into a plurality of wireless communication signals based on the determined precoding matrix. A precoding processor may include a component implemented as a software module to be executed by the same hardware module as the multi-SIM processor. When a base station for wireless communication is determined for each SIM, a wireless communication device may convert data streams into wireless communication signals by receiving the TPMI from each base station. In other words, the precoding processor 721 may generate a first wireless communication signal and a second wireless communication signal by differentiating a precoding matrix for generating the first wireless communication signals TX1 and TX2 from a precoding matrix for generating the second wireless communication signals TX3 and TX4.

As an example, when the first SIM 711 communicates with a first network and the second SIM 712 communicates with a second network, the wireless communication device may receive different TPMIs from each other from the first network and the second network, respectively. Accordingly, the precoding processor 721 may convert the first data streams DS1_1 and DS1_2 received from the first SIM 711 into the first wireless communication signals TX1 and TX2 based on the first precoding matrix, and may convert the second data streams DS2_1 and DS2_2 received from the second SIM 712 into the second wireless communication signals TX3 and TX4 based on the second precoding matrix.

Figure 8:
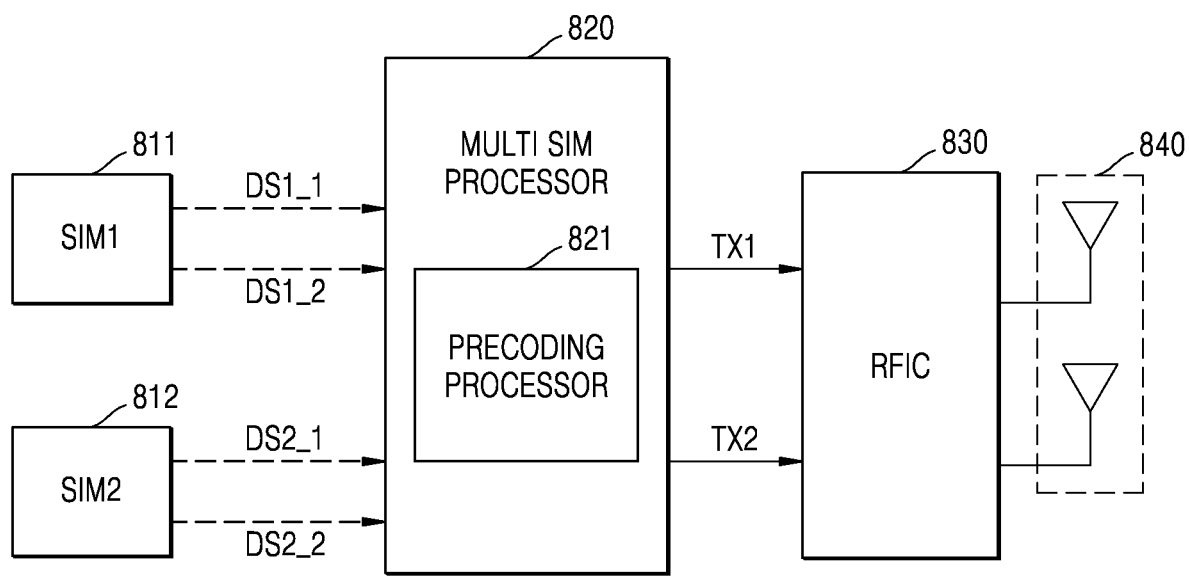
FIG. 8 is a block diagram illustrating signal transmission and reception of a wireless communication device, when the number of available antennas is less than the number of antennas used for communication using a first SIM and a second SIM, according to an embodiment of the inventive concept.

FIG. 8 is a block diagram illustrating signal transmission and reception of a wireless communication device, when the number of available antennas is less than the number of antennas used for communication using a first SIM and a second SIM, according to an embodiment of the inventive concept.

Referring to FIG. 8, when a request for the second wireless communication is received from a second SIM 812 while the first wireless communication is performed, a multi-SIM processor 820 may compare the number of available antennas not allocated to the first wireless communication of an antenna array 840 with the number of antennas used for the second wireless communication. Additionally, or alternatively, when the number of available antennas is less than the number of used antennas, unlike the example embodiment of FIG. 7, the wireless communication device may not simultaneously perform the first wireless communication and the second wireless communication.

According to an embodiment of the inventive concept, fewer antennas may be allocated for the first wireless communication by reducing the number of first data streams DS1_1 and DS1_2 received from the first SIM 811 based on uplink layer information received from the network, and the first wireless communication and the second wireless communication may be performed simultaneously by allocating the available antenna to the second wireless communication. According to another embodiment of the inventive concept, by merging at least some of the first data streams DS1_1 and DS1_2 received from the first SIM 811, the first wireless communication and the second wireless communication may be simultaneously performed. A method of simultaneously performing the first wireless communication and the second wireless communication is described in detail later with reference to FIGS. 9 through 14.

Figure 9:
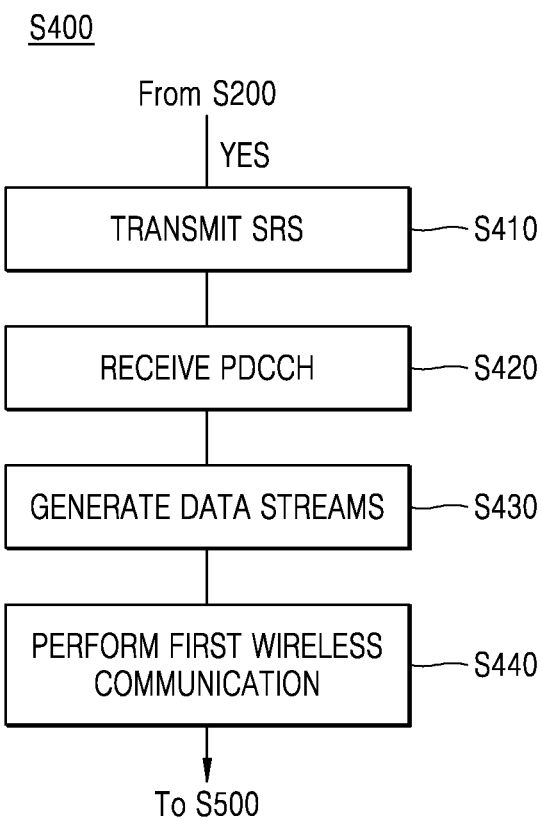
FIG. 9 is a flowchart of a method of performing a first wireless communication, according to an embodiment of the inventive concept.
Figure 10:
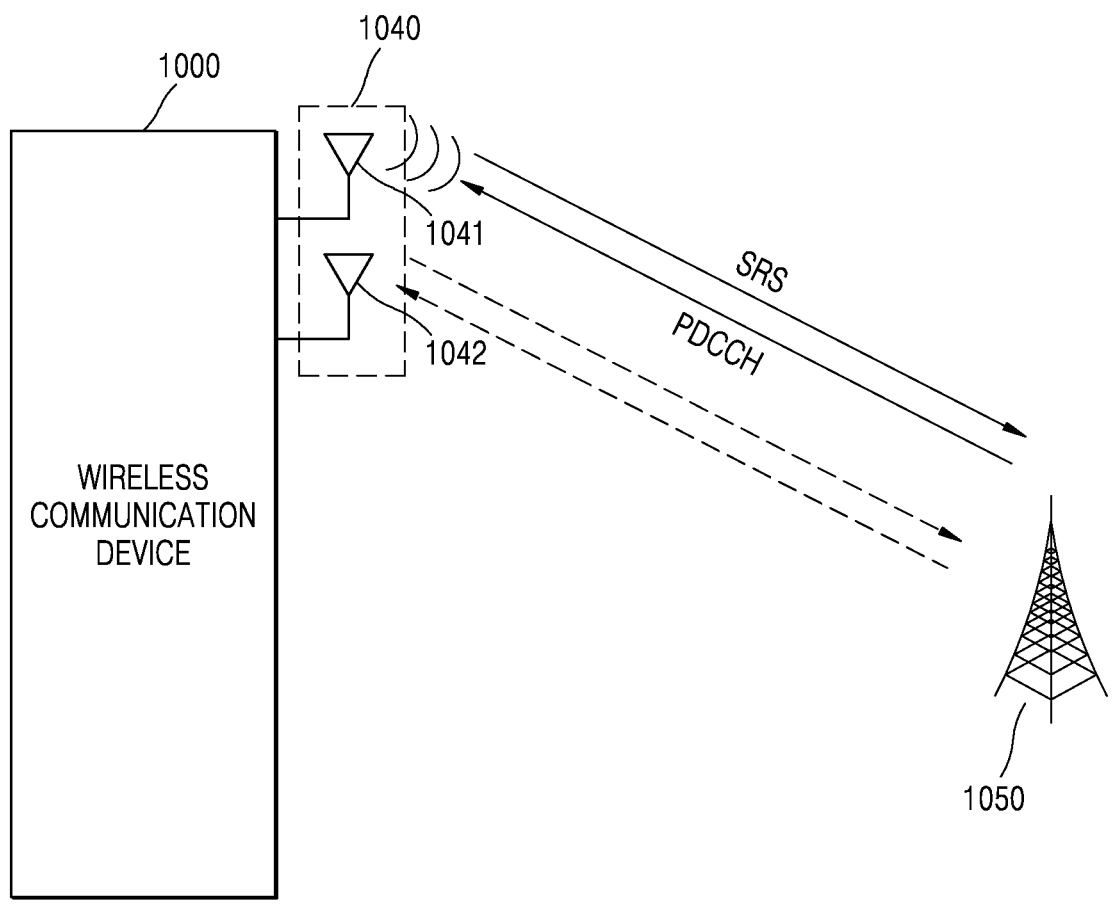
FIG. 10 is a diagram illustrating transmission and reception signals between a base station and a wireless communication device, according to an embodiment of the inventive concept.

FIG. 9 is a flowchart of a method of performing the first wireless communication, according to an embodiment of the inventive concept, and FIG. 10 is a diagram illustrating transmission signals and reception signals between a first base station 1050 and a wireless communication device 1000, according to an embodiment of the inventive concept.

The wireless communication device 1000 according to an embodiment may receive a communication request from a second SIM, and when it is determined that the number of available antennas is less than the number of used antennas, by allocating a first antenna group 1041 of a plurality of antennas 1040 previously performing the first wireless communication to the first wireless communication, may allocate remaining antennas of a second antenna group 1042 to the second wireless communication.

The wireless communication device 1000 may transmit a sounding reference signal (SRS) to the first base station 1050 via the first antenna group 1041 of the plurality of antennas 1040, which previously performed the first wireless communication (S410). The SRS may be a reference signal transmitted from the wireless communication device 1000, and the first base station 1050 may determine a current channel state of the wireless communication device 1000 based on the SRS transmitted via the first antenna group 1041.

The first base station 1050 may select an antenna for performing the first wireless communication by receiving the SRS and measuring the SRS for each antenna of the first antenna group 1041. Referring to FIG. 10, when the wireless communication device 1000 transmits the SRS via the first antenna group 1041, because the first base station 1050 receives the SRS by using fewer antennas than the antennas previously allocated for the first wireless communication, the wireless communication device 1000 may allocate fewer uplink layers for performing the first wireless communication than the number of previously allocated uplink layers. As an example, when the first wireless communication has been performed via two antennas before receiving a request for the second wireless communication, the wireless communication device 1000 may transmit the SRS via one antenna after receiving the request for the second wireless communication.

The first base station 1050 may determine the number of uplink layers based on a channel state of the wireless communication device 1000, and transmit to the wireless communication device 1000 a signal including information about the number of uplink layers via a physical downlink control channel (PDCCH) (S420). The number of uplink layers may correspond to the number of data streams generated by the SIM to transmit data in the wireless communication device 1000.

Referring to FIG. 10, when the first base station 1050 receives the SRS via one antenna after the wireless communication device 1000 receives a request for the second wireless communication, the first base station 1050 may allocate, as an uplink layer of the first wireless communication, the uplink layers the number of which has been previously two but is reduced to one. The first base station 1050 may transmit a command signal to allocate one uplink layer to the wireless communication device 1000 via the PDCCH.

The first SIM may generate the data streams as many as the number of uplink layers received via the PDCCH (S430). Additionally, or alternatively, the uplink layers may be allocated as many as the number of antennas of the first antenna group 1041, and accordingly, the first SIM may generate the data streams as many as the number of antennas of the first antenna group 1041.

The multi-SIM processor may generate the first wireless communication signals corresponding to the number of data streams, and the wireless communication device 1000 may perform the first wireless communication by transmitting the first wireless communication signal via the first antenna group 1041 (S440). Thereafter, the wireless communication device 1000 may perform the second wireless communication via the second antenna group 1042 of the plurality of antennas 1040 that have previously performed the first wireless communication, except the first antenna group 1041.

To simultaneously perform the first wireless communication and the second wireless communication, the wireless communication device 1000 according to an embodiment of the inventive concept may allocate, to the second wireless communication, some of the antennas of the first wireless communication that has been performed before the request for the second wireless communication is received. The wireless communication device 1000 may transceive data via the first antenna group 1041 of the plurality of antennas 1040, and may make the first base station 1050 to allocate fewer uplink layers than those previously allocated in the first wireless communication.

Figure 11:
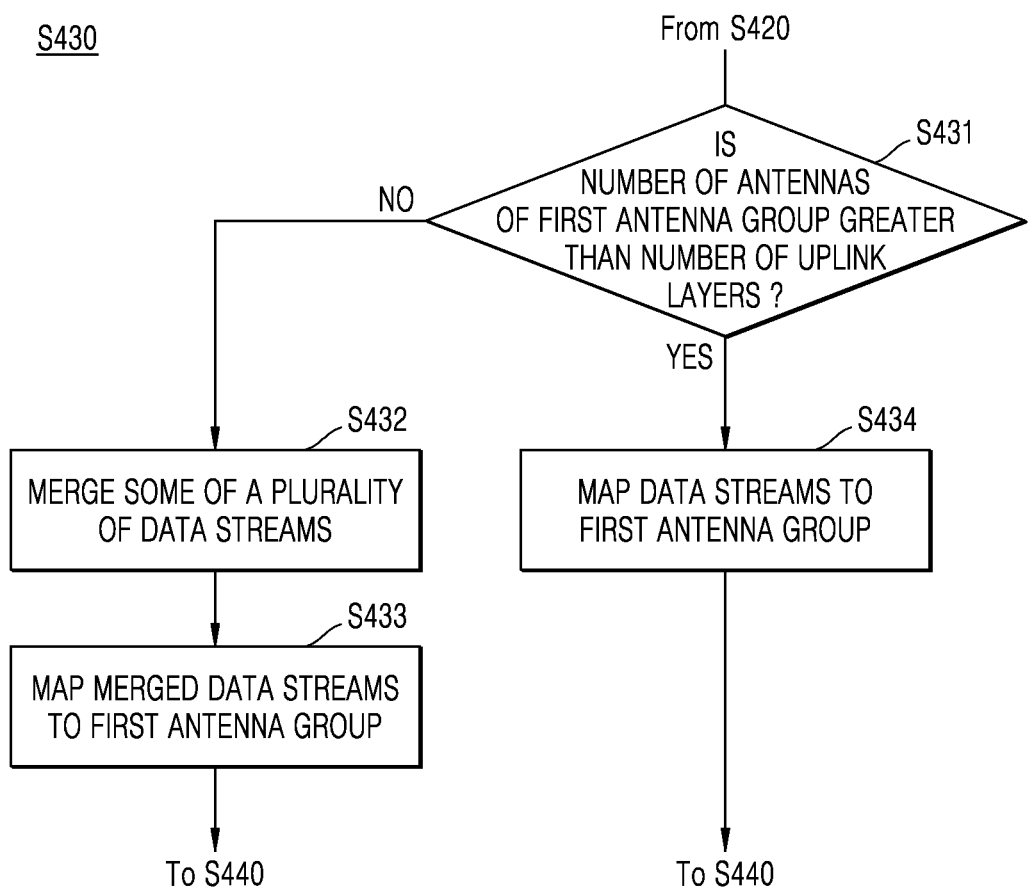
FIG. 11 is a flowchart of a method of performing a first wireless communication by mapping each of antennas of a first antenna group to data streams, according to an embodiment of the inventive concept.

FIG. 11 is a flowchart of a method of performing the first wireless communication by mapping each of antennas of the first antenna group to the data streams, according to an embodiment of the inventive concept.

A wireless communication device according to an embodiment may allocate uplink layers corresponding to the number of antennas of the first antenna group by making the base station decrease the number of uplink layers, but when the base station is not made to decrease the number of uplink layers, the wireless communication device may merge some of the data streams to generate wireless communication signals corresponding to the number of antennas of the first antenna group.

A multi-SIM processor may determine whether the number of antennas of the first antenna group is greater than or equal to the number of uplink layers received via the PDCCH (S431). When the multi-SIM processor determines that the number of antennas of the first antenna group is greater than or equal to the number of uplink layers, the wireless communication device may perform the first wireless communication by proceeding to operation S434, and when it is determined that the number of uplink layers is greater than the number of antennas of the first antenna group, an operation may proceed to operation S432 to merge some of the data streams.

Because the number of uplink layers to be reduced are not reduced, the multi-SIM processor may determine that the number of uplink layers of the first antenna group is greater than the number of antennas of the first antenna group (S432). Accordingly, some of the data streams received from the first SIM may be merged to generate wireless communication signals corresponding to the number of antennas of the first antenna group. According to an embodiment of the inventive concept, a precoding processor may merge a plurality of data streams based on a merge precoding matrix.

The multi-SIM processor may generate a wireless communication signal based on the merged data stream, and the RFIC may allocate the wireless communication signals to the antennas of the first antenna group and transmit the allocated wireless communication signals to a network (S433).

When uplink layers corresponding to the number of antennas of the first antenna group are allocated, the multi-SIM processor may receive data streams corresponding to the number of antennas of the first antenna group (S434). The multi-SIM processor may generate wireless communication signals corresponding to the data streams based on the precoding matrix, and the RFIC may allocate the wireless communication signals to antennas of the first antenna group and transmit the allocated wireless communication signals to the network.

Accordingly, the wireless communication device may perform the first wireless communication via the first antenna group, and by performing the second wireless communication via the second antenna group differentiated from the first antenna group, may simultaneously perform the first wireless communication and the second wireless communication even in a state in which the RF resources such as antennas are limited.

Figure 12:
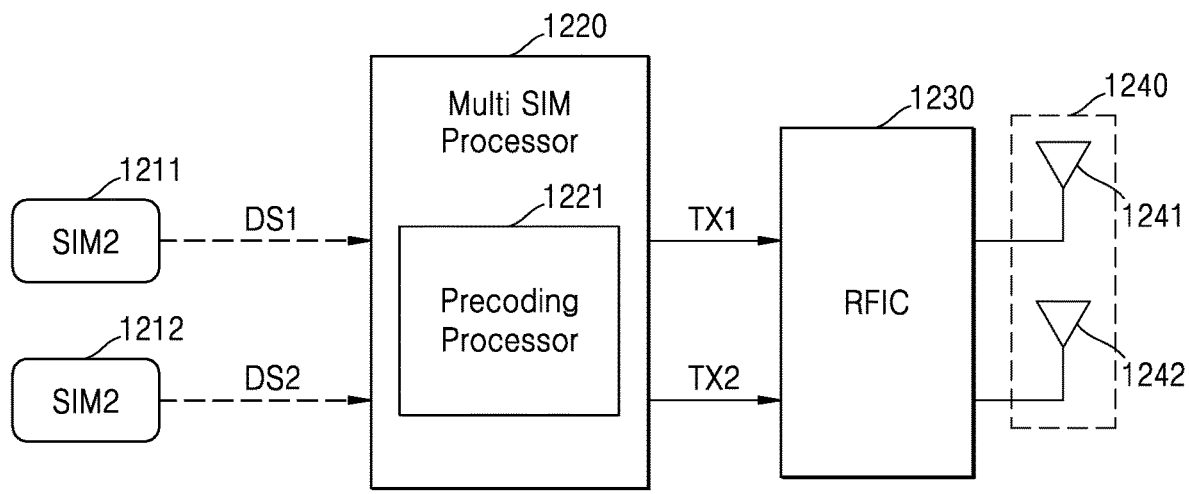
FIG. 12 is a block diagram illustrating a method of performing wireless communication when uplink layers corresponding to the number of antennas of a first antenna group are allocated, according to an embodiment of the inventive concept.

FIG. 12 is a block diagram illustrating a method of performing wireless communication when uplink layers corresponding to the number of antennas of a first antenna group 1241 are allocated, according to an embodiment of the inventive concept.

Referring to FIG. 12, when a request for the second wireless communication is received while the first wireless communication is performed, and the number of used antennas is greater than the number of available antennas, a first SIM 1211 and a second SIM 1212 may simultaneously perform the first wireless communication and the second wireless communication by reducing the data streams corresponding to the number of uplink layers, respectively.

A multi-SIM processor 1220 in FIG. 12 may receive two data streams from the first SIM 1211 and the second SIM 1212 according to the embodiment of FIG. 8, respectively, and may determine that the number of antennas used for the first wireless communication and the second wireless communication is four, which may be more than two or the number of available antennas. The multi-SIM processor 1220 may transceive data via the first antenna group 1241, which may be a portion of antenna array 1240 previously allocated to the first wireless communication, and based on the information about the number of uplink layers, the first SIM 1211 may allocate one uplink layer less than two uplink layers previously allocated to the first wireless communication. By allocating one uplink layer to the first SIM 1211, the first SIM 1211 may generate one data stream DS1, and perform the first wireless communication via the first antenna group 1241 of the antenna array 1240 previously allocated to the first wireless communication. The second wireless communication of the second SIM 1212 may be performed via the second antenna group 1242 by reducing the number of data streams generated by the second SIM 1212 to correspond to the number of uplink layers, similarly to the first wireless communication.

According to the embodiment of FIG. 12, a case in which the first wireless communication and the second wireless communication are simultaneously performed by reducing a plurality of data streams to one and transmitting the wireless communication signal via one antenna is illustrated, but the embodiment is not limited thereto, and a case may also be one in which a wireless communication device according to an embodiment of the inventive concept performs the first wireless communication via the first antenna group including a plurality of antennas, and the second wireless communication via the second antenna group including a plurality of antennas.

Figure 13:
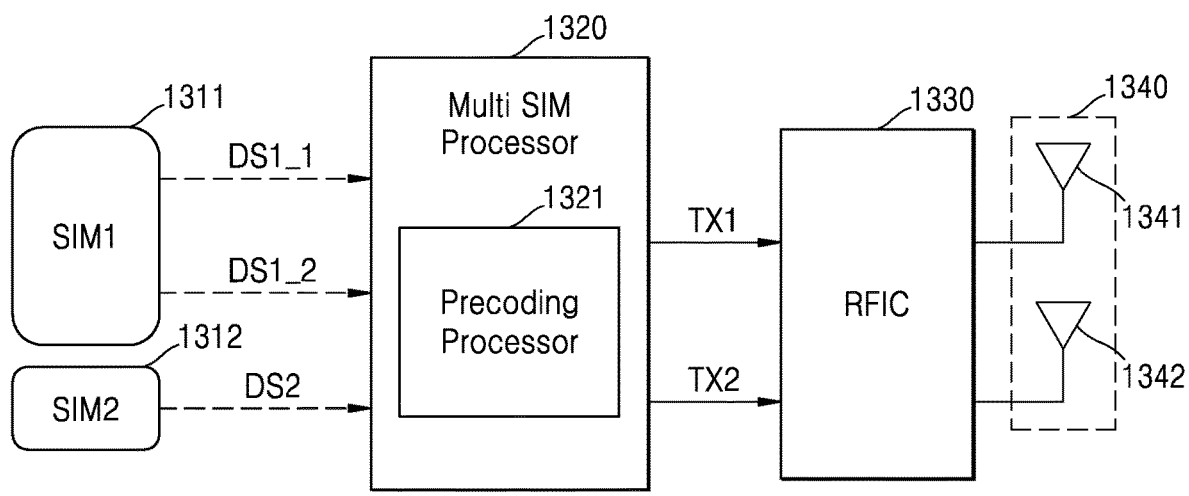
FIG. 13 is a block diagram illustrating a method of performing wireless communication when uplink layers corresponding to the number of antennas in a first antenna group are not allocated, according to an embodiment of the inventive concept.

FIG. 13 is a block diagram illustrating a method of performing wireless communication when uplink layers corresponding to the number of antennas in the first antenna group are not allocated, according to an embodiment of the inventive concept.

The embodiment of FIG. 13 may include an embodiment in which the wireless communication device has made a base station allocate fewer uplink layers than the previously allocated uplink layers, but because a channel status is determined as not so deteriorated to use the uplink layer being reduced, the uplink layers are allocated without being reduced. When the uplink layers are not reduced, a multi-SIM processor 1320 may receive two data streams from a first SIM 1311 as before and generate one first wireless communication signal TX1 by merging two data streams into one. By generating one first wireless communication signal TX1 based on two data streams, a multi-SIM processor 1320 may perform the first radio communication via a first group of antennas 1341 of antenna array 1340.

By receiving the second data stream DS2 from a second SIM 1312, and generating the second wireless communication signal TX2 based on the received data stream, the wireless communication device may perform the second wireless communication via a second antenna group 1342 of the antenna array 1340.

A precoding processor 1321 of the multi-SIM processor 1320 may convert the first data streams DS1_1 and DS1_2 into the first wireless communication signal TX1 based on a merge precoding matrix. The merge precoding matrix may include a matrix that merges the first data streams DS1_1 and DS1_2, and for example, may include one of the matrices in Table 2.

TABLE 2

| M_TPMI[0] | M_TPMI[1] |
|---|---|
| $\frac{1}{\sqrt{2}}\begin{bmatrix}1 & 0\\ 1 & 0\end{bmatrix}$ | $\frac{1}{\sqrt{2}}\begin{bmatrix}0 & 1\\ 0 & 1\end{bmatrix}$ |

The precoding processor 1321 may merge the first data streams DS1_1 and DS1_2 and/or the second data streams DS2 by selecting one of the matrices in Table 2 according to a transmission and reception status of the first SIM 1311 and the second SIM 1312. As an example, in a state of transmitting data to the second SIM 1312 while transceiving data to and from the first SIM 1311, the precoding processor 1321 may merge the data streams based on the merge precoding matrix M_TPMI[0].

Independent demodulation reference signal (DMRS) may be stored in each of the data streams generated by the SIM, and even when the data streams are merged into wireless communication signals by the precoding processor 1321, the base station may recognize each channel as an independent channel by using the DMRS.

Figure 14:
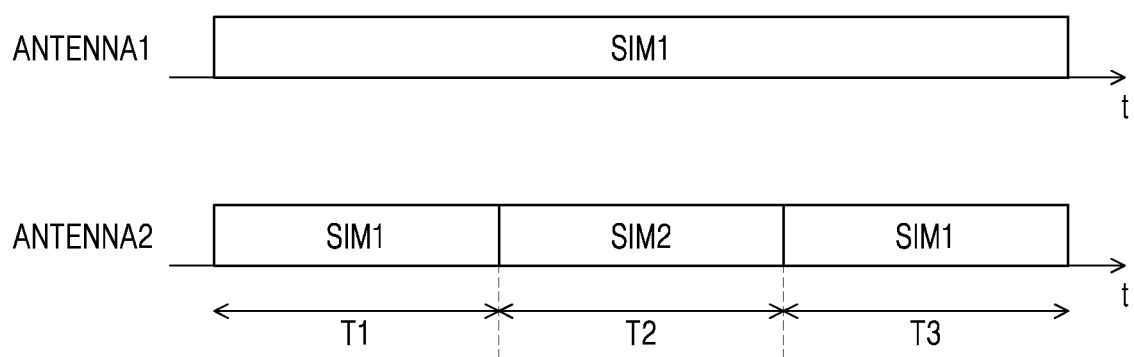
FIG. 14 is a timing diagram of a wireless communication method by using a first SIM and a second SIM, according to an embodiment of the inventive concept.

FIG. 14 is a timing diagram of a wireless communication method by using a first SIM and a second SIM, according to an embodiment of the inventive concept.

Referring to FIG. 14, a wireless communication device may be in a state in which the first wireless communication is performed during a first time period T1, and may generate first wireless communication signals by receiving first data streams from the first SIM. During the first time period T1, the wireless communication device may transmit the first wireless communication signals to a network via a plurality of antennas with a first antenna group antenna1 and a second antenna group antenna2.

The wireless communication device may enter a second time period T2 by receiving, from a second SIM, a request for the second wireless communication, and a multi-SIM processor may determine whether it is possible to perform the second wireless communication based on available antennas except a plurality of antennas that have performed the first wireless communication during the first time period T1. When it is determined that it is impossible to perform the second wireless communication based on the available antennas, the multi-SIM processor may reduce the number of antennas allocated to the first wireless communication so that the second wireless communication may be performed via the second antenna group antenna2 of the plurality of antennas. During the second time period T2, by allocating the first antenna group antenna1 to the first wireless communication, and the second antenna group antenna2 differentiated from the first antenna group antenna1 to the second wireless communication, the wireless communication device may simultaneously perform the first wireless communication and the second wireless communication.

During a third time period T3, when it is determined that a communication request from the second SIM is completed, the wireless communication device may allocate to the first wireless communication again the second antenna group antenna2 that have been allocated to the second wireless communication back. FIG. 14 illustrates a case in which, when a communication request termination is received from the second SIM during the third time period T3, the wireless communication device allocates the second antenna group antenna2 to the first wireless communication. However, the embodiment of the inventive concept is not limited thereto, and an embodiment may be one in which, when a communication termination request is received from the first SIM, the wireless communication device allocates to the second wireless communication the first antenna group antenna1 that has been allocated to the first wireless communication. Therefore, by scheduling antenna allocation according to a start request and a termination request of the first wireless communication or the second wireless communication, the wireless communication device may efficiently perform the multi-SIM wireless communication.

While the inventive concept has been particularly shown and described with reference to embodiments thereof, it will be understood that various changes in form and details may be made therein without departing from the spirit and scope of the following claims.

What is claimed is:

1. A method of operating a communication device, the method comprising:
   performing a first wireless communication based on a first SIM using a plurality of antennas by transmitting a sounding reference signal (SRS) via each of the plurality of antennas;
   receiving a communication request related to a second SIM while communicating with the first SIM;
   ceasing to transmit the sounding reference signal (SRS) in at least one antenna of the plurality of antennas,
   performing a second wireless communication based on the second SIM using the at least one antenna while communicating with the first SIM.

2. The method of claim 1, wherein the ceasing transmitting the sounding reference signal in the at least one antenna of the plurality of antennas comprises:
   determining that a sum of a number of antennas used for communicating with the first SIM and a number of antennas for the communication request related to the second SIM is greater than a number of available antennas.

3. The method of claim 2, wherein determining whether the sum of the number of antennas used for communicating with the first SIM and the second SIM is greater than the number of available antennas comprises:
   determining the number of antennas used for communicating with the first SIM with a number of data stream received from the first SIM; and
   determining the number of antennas used for communicating with the second SIM with a number of data stream received from the second SIM.

4. The method of claim 1, wherein the performing of the first wireless communication comprises:
   receiving information about a number of uplink layers corresponding to the plurality of antennas via a physical downlink control channel (PDCCH) corresponding to the SRS; and
   generating data streams based on the information about the number of uplink layers.

5. The method of claim 4, wherein the performing of the first wireless communication comprises:
   determining whether uplink layers corresponding to a number of antennas of the plurality of antennas are allocated; and
   performing the first wireless communication in response to a case in which the uplink layers corresponding to the number of antennas of the plurality of antennas are allocated.

6. The method of claim 5, wherein the first wireless communication is performed by allocating the data streams to the plurality of antennas.

7. The method of claim 5, wherein the performing of the first wireless communication comprises:
   merging at least some of the data streams in response to a case in which uplink layers corresponding to the number of antennas of the plurality of antennas are not allocated; and
   performing the first wireless communication by allocating the merged data streams to the plurality of antennas.

8. The method of claim 7, wherein the merging of the at least some of the data streams comprises merging the data streams in correspondence to the number of antennas of the plurality of antennas.

9. The method of claim 7, wherein the merging of the at least some of the data streams comprises merging the data streams based on a merge precoding matrix.

10. The method of claim 4, wherein the performing the first wireless communication comprises receiving the data streams and generating a wireless communication signal corresponding to the data stream.

11. The method of claim 10, wherein the generating the wireless communication signal comprises generating the wireless communication signal using matrix corresponding to a transmit precoding matrix index (TPMI).

12. A method of operating a communication device, the method comprising:
   performing a first wireless communication in a first network using a plurality of antennas by transmitting a sounding reference signal (SRS) via each of the plurality of antennas;

receiving a communication request related to a second network while communicating in the first network;

ceasing transmitting the sounding reference signal (SRS) in at least one antenna of the plurality of antennas, performing a second wireless communication in the second network using the at least one antenna which ceased transmitting the sounding reference signal while communicating in the first network with at least one antenna, which is different from the at least one antenna which ceased transmitting the sounding reference signal, of the plurality of antennas.

13. The method of claim 12, wherein the performing of the first wireless communication comprises:

receiving information about a number of uplink layers corresponding to the plurality of antennas via a physical downlink control channel (PDCCH) corresponding to the SRS; and generating data streams based on the information about the number of uplink layers.

14. The method of claim 13, wherein the performing of the first wireless communication comprises:

determining whether uplink layers corresponding to a number of antennas of the plurality of antennas are allocated; and performing the first wireless communication in response to a case in which uplink layers corresponding to the number of antennas of the plurality of antennas are allocated.

15. The method of claim 14, wherein the first wireless communication is performed by allocating the data streams to the plurality of antennas.

16. The method of claim 14, wherein the performing of the first wireless communication comprises:

merging at least some of the data streams in response to a case in which uplink layers corresponding to the number of antennas of the plurality of antennas are not allocated; and performing the first wireless communication by allocating the merged data streams to the plurality of antennas.

17. The method of claim 16, wherein the merging of the at least some of the data streams comprises merging the data streams in correspondence to the number of antennas of the plurality of antennas.

18. The method of claim 16, wherein the merging of the at least some of the data streams comprises merging the data streams based on a merge precoding matrix.

19. An electronic device comprising:

a first SIM;

a second SIM;

a multi-SIM processor configured to perform a first wireless communication based on the first SIM using a plurality of antennas by transmitting a sounding reference signal (SRS) via each of the plurality of antennas;

to receive a communication request by the second SIM while communicating with the first SIM;

to cease transmitting the sounding reference signal (SRS) in at least one antenna of the plurality of antennas;

to perform a second wireless communication based on the second SIM using the at least one antenna which ceased transmitting the sounding reference signal while communicating with the first SIM.

20. The electronic device of claim 19, wherein the multi-SIM processor is further configured to perform wireless communication using a protocol stack system.

* * * * *